(12) United States Patent
Lee et al.

(10) Patent No.: US 12,295,073 B2
(45) Date of Patent: May 6, 2025

(54) BASE STATION DEVICE AND METHOD FOR OPERATING BASE STATION DEVICE

(71) Applicant: SK TELECOM CO., LTD., Seoul (KR)

(72) Inventors: Dong Jin Lee, Seoul (KR); Seong Jun Lee, Seoul (KR); Hyun Jun Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 18/012,285

(22) PCT Filed: Jun. 29, 2021

(86) PCT No.: PCT/KR2021/008196
§ 371 (c)(1),
(2) Date: Dec. 22, 2022

(87) PCT Pub. No.: WO2022/005173
PCT Pub. Date: Jan. 6, 2022

(65) Prior Publication Data
US 2023/0269575 A1    Aug. 24, 2023

(30) Foreign Application Priority Data

Jun. 29, 2020 (KR) .................. 10-2020-0079482

(51) Int. Cl.
*H04W 8/26* (2009.01)
*H04L 67/141* (2022.01)
*H04W 24/08* (2009.01)

(52) U.S. Cl.
CPC ............. *H04W 8/26* (2013.01); *H04L 67/141* (2013.01); *H04W 24/08* (2013.01)

(58) Field of Classification Search
CPC ........ H04W 8/26; H04W 24/08; H04L 67/141
See application file for complete search history.

(56) References Cited

U.S. PATENT DOCUMENTS

| 7,941,560 | B1  |   | 5/2011  | Friesen et al.         |
|-----------|-----|---|---------|------------------------|
| 8,825,814 | B1  | * | 9/2014  | Efrati ......... H04L 65/1104 |
|           |     |   |         | 455/418                |
| 2011/0126287 | A1 | * | 5/2011 | Yoo ............. G06F 21/567 |
|           |     |   |         | 726/24                 |
| 2011/0142212 | A1 | * | 6/2011 | Kim ............. H04L 12/2889 |
|           |     |   |         | 379/93.02              |
| 2011/0319083 | A1 | * | 12/2011 | Lee ............. H04W 36/14 |
|           |     |   |         | 455/436                |

(Continued)

FOREIGN PATENT DOCUMENTS

KR    10-2019-0120340    10/2019

OTHER PUBLICATIONS

International Search Report dated Oct. 1, 2021 issued in Application No. PCT/KR2021/008196.

(Continued)

*Primary Examiner* — Brian Whipple
(74) *Attorney, Agent, or Firm* — KED & ASSOCIATES, LLP

(57) ABSTRACT

The present disclosure is to implement a technique (scheme) of guaranteeing the mobility of an application server that enables a user equipment (UE) to seamlessly use a data service in real time even when the application server is changed.

8 Claims, 6 Drawing Sheets

(56) References Cited

U.S. PATENT DOCUMENTS

| | | |
|---|---|---|
| 2012/0076120 A1 | 3/2012 | Kovvali et al. |
| 2014/0134996 A1 | 5/2014 | Barclay et al. |
| 2015/0207777 A1* | 7/2015 | Chilla ..................... H04L 67/01 |
| | | 709/203 |
| 2016/0127232 A1* | 5/2016 | Kano ...................... H04L 69/22 |
| | | 370/392 |
| 2017/0126618 A1 | 5/2017 | Bhaskaran et al. |
| 2019/0281492 A1* | 9/2019 | Hans ................... H04L 47/2475 |
| 2019/0364420 A1* | 11/2019 | Rommer ............. H04W 12/033 |
| 2020/0036678 A1* | 1/2020 | Sreenivas ........... H04L 61/4511 |
| 2022/0360977 A1* | 11/2022 | Kim ........................ H04L 65/80 |

OTHER PUBLICATIONS

Chinese Office Action (with English Translation) dated Feb. 19, 2025, issued in Application No. 202180046132.6.

* cited by examiner

BASE STATION DEVICE AND METHOD FOR OPERATING BASE STATION DEVICE

CROSS-REFERENCE TO RELATED PATENT APPLICATIONS

This application is a U.S. National Stage Application under 35 U.S.C. § 371 of PCT Application No. PCT/KR2021/008196, filed Jun. 29, 2021, which claims priority to Korean Patent Application No. 10-2020-0079482, filed Jun. 29, 2020, whose entire disclosures are hereby incorporated by reference.

TECHNICAL FIELD

The present disclosure relates to guarantee the mobility of a server (application server).

This application is based on claims priority from Korean Patent Application No. 10-2020-0079482, filed on Jun. 29, 2020, in the Korean Intellectual Property Office, the disclosure of which is herein incorporated by reference in its entirety.

BACKGROUND ART

The 5G communication system accommodates as many user equipments (UEs) as possible using limited radio resources, and supports scenarios of enhanced mobile broadband (eMBB)/massive machine type communications (mMTC)/ultra-reliable and low latency communications (URLLC).

Particularly, 5G defines a network structure for supporting a UE, a base station (access), a core, and a server in an end to end manner.

In addition, 5G separates a control signaling function and a data transmission/reception function that have been complexly performed by a single node (e.g., S-GW, P-GW, and the like) in a legacy EPS network (4G). 5G defines a network structure in which an area (control plane) for a control signaling function and an area (user plane) for a data transmission/reception function are divided.

Recently, 5G evolves to provides an edge service by a node (hereinafter, an edge node) closest to a customer (UE) for a low latency service. For this, technology such as cloud, virtualization (VM/container), and the like has appeared.

Due to the characteristics of an application that has been recently developed, a destination IP (application server IP) is changed from the perspective of a UE have, and thus a service IP address is changed frequently.

Particularly, exchanges between a 5G core network/public cloud network are also needed due to edge computing technologies, and thus a destination IP may be changed frequently from the perspective of a UE.

As described above, if a destination IP (application server IP) is frequently changed from the perspective of a UE, it is difficult to provide a data service to a customer/UE in real time, and the service quality may deteriorate.

However, according to the current standard, it has not been provided that a scheme of guaranteeing data service provision even when a destination IP is changed from the perspective of a UE, that is, a specific scheme of guaranteeing the mobility of an application server.

Accordingly, the present disclosure provides a detailed scheme that guarantees the mobility of an application server, and thus may provide a service environment where an increase in the service quality and a low latency service are capable of being realized.

DISCLOSURE OF INVENTION

Technical Problem

An aspect of the present disclosure is to provide a detailed scheme that guarantees the mobility of an application server.

Solution to Problem

According to an embodiment of the present disclosure, a base station device may include a change determining unit configured to determine whether the server address of a data service is changed in the state in which a session for traffic transmission of the data service is established between a user equipment (UE) and a server, and an information transferring unit configured to transfer address information associated with a changed server to the UE in the case that the server address of the data service is determined as being changed so that the UE performs traffic transmission of the data service using the address information of the changed server.

Specifically, in the case that the notification of a change of the server of the data service for the UE is provided from a node of a control plane, the change determining unit is configured to compare address information of the server based on the notification and address information of the server that the UE uses when performing the traffic transmission of the data service, and to determine whether the server address of the data service is changed.

Specifically, the address information of the server that the UE uses for the traffic transmission of the data service may be monitored based on a node of a user plane that is involved in the session.

Specifically, in the case that the notification of a change of the server of the data service for the UE is provided from a node of a control plane, the address information transferred to the UE is transferred via a message transmitted to the UE during a process of performing user plane reconfiguration that adds, removes, or rearranges a node of a user plane that is involved in the session.

Specifically, the information transferring unit is configured to transmit destination information including the address information to the UE, and the destination information may include at least one piece of information among address information including at least one of addresses of link layer (L2), Internet layer (L3), transport layer (L4), and application layer (L7) according to Internet protocol suite in association with the changed server, activation information associated with a time point of performing traffic transmission using the address information of the changed server, duration information associated with a performance period, information associated with a protocol apply scheme used at a time of performance, and information associated with a protocol processing scheme.

Specifically, the base station device may be at least one of nodes of the control plane.

According to an embodiment of the present disclosure, a UE device may include an information receiver configured to receive changed server address information that is associated with a server of a data service from a node of a control plane in the state in which a session for traffic transmission of the data service between the UE device and a server is established, and an application unit configured to perform traffic transmission of the data service using the changed server address information, upon reception of the changed server address information.

Specifically, the changed server address may be transferred when address information of the server based on a change of the server of the data service that is provided via a notification from the control plane is different from address information of the server that is monitored as being used for traffic transmission of the data service in a user plane.

According to an embodiment of the present disclosure, an operation method of a base station device may include a change determination operation that determines whether a server address of a data service is changed in the state in which a session for traffic transmission of the data service is established between a UE and a server, and an information transfer operation that transfers address information associated with a changed server to the UE in the case that the server address of the data service is determined as being changed so that the UE performs the traffic transmission of the data service using the address information of the changed server.

Specifically, the change determination operation may include, in the case that a notification of a change of the server of the data service for the UE is provided from a node of a control plane, an operation of comparing the address information of the server based on the notification and address information of the server that the UE uses for traffic transmission of the data service, and an operation of determining, based on a result of the comparison, whether the server address of the data service is changed.

Specifically, the address information of the server that the UE uses for traffic transmission of the data service may be monitored based on a node of a user plane that is involved in the session.

Advantageous Effects of Invention

According to embodiments of the present disclosure, a detailed scheme that guarantees the mobility of an application server is realized in a manner of enabling a UE to immediately apply/use a changed address every time that the address of a destination IP (application server IP) is changed.

Therefore, according to embodiments of the present disclosure, by guaranteeing the mobility of an application server, an effect of providing a service environment in which an increase in the quality for customers and a low latency service are capable of being realized is obtained.

BEST MODE FOR CARRYING OUT THE INVENTION

Hereinafter, embodiments of the present disclosure will be described with reference to the accompanying drawings.

The present disclosure relates to a technique for guaranteeing the mobility of a server (application server).

The 5G communication system receives as many user equipments (UEs) as possible based on the limited amount of radio resource, and supports scenarios of enhanced mobile broadband (eMBB)/massive machine type communications (mMTC)/ultra-reliable and low latency communications (URLLC).

Particularly, in 5G, a network structure is defined to support a UE, a base station (access), a core, and a server in an end to end manner.

In addition, in 5G, a network structure is defined as a structure in which an area (control plane) for a control signaling function and an area (user plane) for a data transmission/reception function are divided by separating a control signaling function and a data transmission/reception function that have been complexly performed by a single node (e.g., an S-GW, a P-GW, and the like) in a legacy EPS network (4G).

Figure 1:
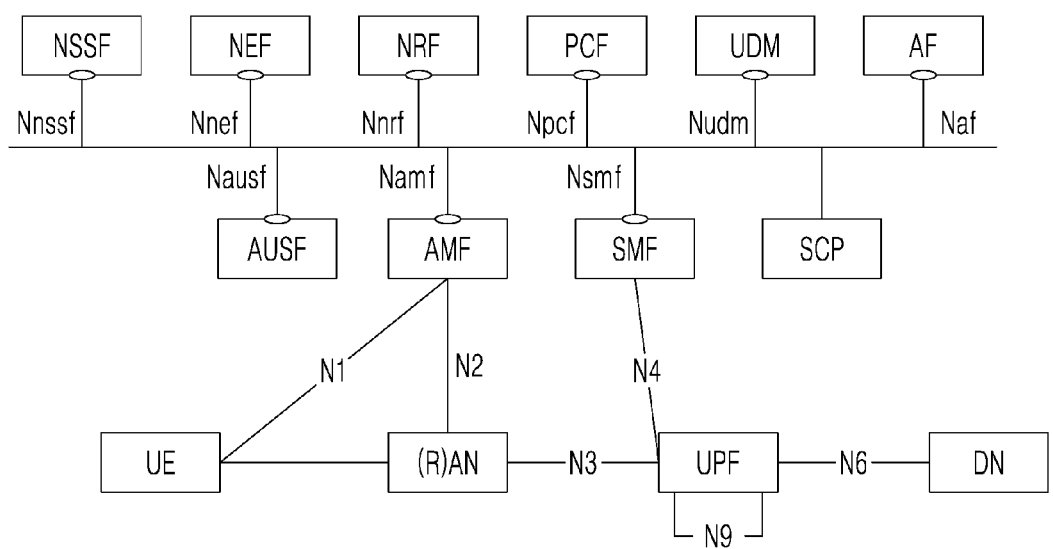
FIG. 1 is a diagram illustrating the structure of a 5G system.

FIG. 1 is a diagram illustrating the structure of a 5G system.

As shown in FIG. 1, a control node of a control plane in 5G may be defined as an access and mobility function (AMF) that controls wireless section access of a UE, a session management function (SMF) that manages/controls a session for using a data service for each UE, a network exposure function (NEF) that is in charge of a function of sharing information with an external network, a network repository function (NRF) that manages/controls information associated with each of the nodes in a network, an application function (AF) that manages/controls an application service, and the like.

In 5G, a data node in the user plane of 5G may be defined as a user plane function (UPF) that performs data transmission or reception between a UE and an application server via a session with the UE based on the control of (interoperation with) an SMF.

Recently, in 5G, the structure is being evolved in a manner in which a node (hereinafter, an edge node) closest to a customer (UE) provides an edge service for a low latency service, and technology such as cloud, virtualization (VM/container), and the like has appeared.

Due to the characteristics of an application that has been recently developed, scenarios in which a destination IP (application server IP) is changed from the perspective of a UE have observed and thus, a change of a service IP address frequently occurs.

Particularly, since edge computing technologies have been realized, exchanges between a 5G core network/public cloud network are also needed, and thus a change of a destination IP may frequently occur from the perspective of a UE.

As described above, if a destination IP (application server IP) is frequently changed from the perspective of a UE, it is difficult to provide a data service to a customer/UE in real time, and thus a quality for the customer may deteriorate.

However, according to the current standard, a scheme of guaranteeing data service provision even when a destination IP is changed from the perspective of a UE, that is, an embodied scheme of guaranteeing the mobility of an application server, has not been provided.

Accordingly, the present disclosure provides a detailed scheme that guarantees the mobility of an application server, and thus may provide a service environment where an increase in the quality for customers and a low latency service are capable of being realized.

Briefly describing, a technical scheme (hereinafter, an application server mobility guarantee technique) provided in the present disclosure realizes data monitoring performed at all times between a UE and a server in a core network, and enables the UE (local cache) to immediately use a changed address in the case that a server address (destination IP) needs to be changed based on the monitoring.

Hereinafter, a base station device (hereinafter, referred to as a network device) that embodies an application server mobility guarantee technique provided in the present disclosure will be described.

Figure 2:
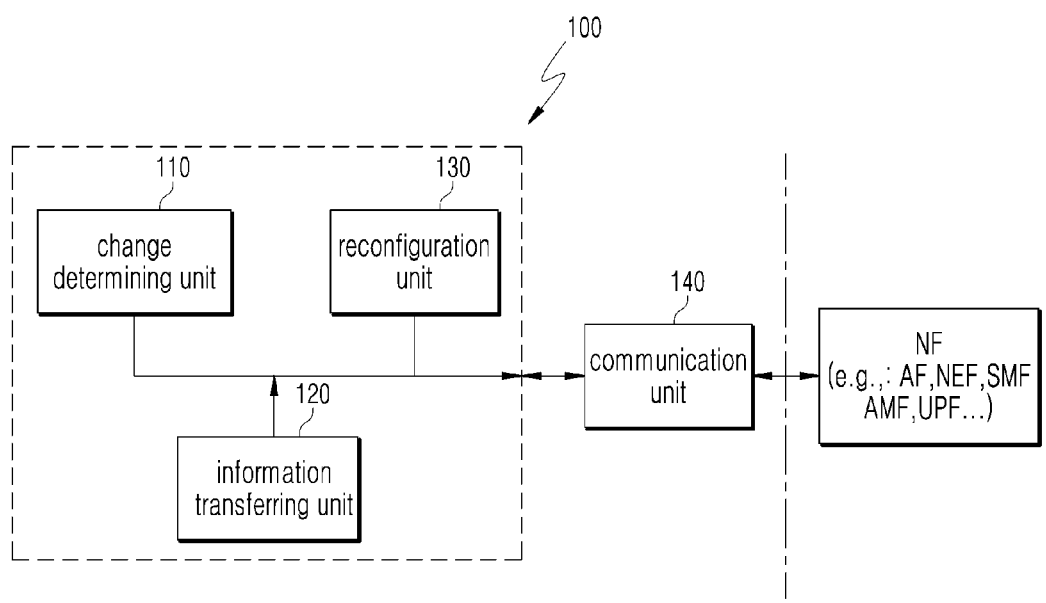
FIG. 2 is a block diagram illustrating the configuration of a base station device (network device) according to an embodiment of the present disclosure.

FIG. 2 illustrates the configuration of a network device of the present disclosure.

As illustrated in FIG. 2, a network device 100 according to an embodiment of the present disclosure may include a change determining unit 110 and an information transferring unit 120.

Furthermore, the network device 100 according to an embodiment of the present disclosure may further include a reconfiguration unit 130.

The network device 100 of the present disclosure may be a control node of a control plane illustrated in FIG. 1, and an example thereof may be an SMF or an AMF.

The network device 100 according to an embodiment of the present disclosure may communicate with an NF (AF, an NEF, and the like) of the control plane. In the case that the network 100 is an SMF, the network device 100 may communicate with an NF (e.g., a UPF) of a user plane, and in the case that the network device 100 is an AMF, the network 100 may further include a communication unit 140 to communicate with an (R)AN of a UE side and a UE.

Accordingly, the communication unit 140 may support an inter-NF communication service based interface (request/response, subscribe/notify) that is defined to communicate with the NF (e.g., an AF, an NEF, and the like) of the control plane, may support an N4 interface defined to communicate with an UPF, may support an N2 interface defined to communicate with an (R)AN, and may support an N1 interface defined to communicate with a UE.

Given an LTE (NSA) environment, an AMF/SMF may be a 5G MME and an SMF/UPF may be 5G SPGW-C/SPGW-U, and the network device 100 of the present disclosure may correspond to any one of a 5G MME and a 5G SPGW-C/SPGW-U, or may correspond to two or more of them.

Hereinafter, for ease of description, it will be described that the network device 100 of the present disclosure is an AMF/SMF.

The whole or at least a part of the configuration of the network device 100 may be embodied in the form of a hardware module or a software module, or may be embodied in the form of a combination of a hardware module and a software module.

Here, the software module may be considered as, for example, an instruction executed by a processor that controls an operation in the network device 100, and such an instruction may be contained in memory in the network device 100.

The network device 100 according to an embodiment of the present disclosure embodies a scheme provided in the present disclosure, that is, the application server mobility guarantee technique, via the above-described configuration. Hereinafter, each element in the network device 100 used for embodying the same will be described in detail.

In the state in which a session for traffic transmission of a data service between a UE and a server is established, the change determining unit 110 may determine whether a server address of the data service is changed.

In this instance, the scheme provided in the present disclosure, that is, the application server mobility guarantee technique, may be operable/applicable, irrespective of whether the session established between the UE and the server is in an active state or an idle state.

That is, the change determining unit 110 may determine whether the server address of the data service is changed with respect to the session (irrespective of the active or idle state) established for traffic transmission of the data service between an application in the UE and a corresponding application server, and may determine whether the server address (e.g., a destination IP) from the perspective of the UE (local cache) needs to be changed.

Specifically, the data service between the application in the UE and the corresponding application server may perform communication by distinguishing a source IP (i.e., a client IP) of the UE and the destination IP (i.e., a server IP) of the server.

In this instance, the IP of the UE may be allocated based on an IP pool in a 5G core network (network function, NFs), and the server IP may be an IP that is used in a WAN section/Internet exchange and public Internet.

The server address for which determination is performed whether a change has been made in the present disclosure may be different from an internal IP of an actual server via network address translation (NAT) from the perspective of the structure of the Internet.

However, fundamentally, the server address for which determination is performed whether a change has been made in the present disclosure may be the IP of the UE from the perspective of a 5G core communication network and address information (e.g., a MAC address, an IP address, a transport address, an application address, or the like) of a destination corresponding to an end (peer) when the corresponding UE performs traffic transmission (transmission/reception).

Hereinafter, whether the server address of a data service is changed, that is, a process of determining whether a UE (local cache) needs to change a server address (e.g., a destination IP), will be described in detail.

In the case that a notification associated with a change of the server of the data service for the UE is received from a node of the control plane, the change determining unit 110 may compare the address information of the server based on the notification and address information of the server that the UE uses for traffic transmission of the data service, and may determine whether the server address of the data service is changed.

In this instance, the address information of the server that the UE uses for traffic transmission of the data service may be monitored based on a node of the user plane, that is, a UPF, that is involved in the session.

The application server corresponding to the data service end (peer) of the UE mentioned in the present disclosure may be a public server in the public/cloud internet, a cloud server, and an edge server embodied in a location close to a customer (UE) for an edge service.

According to an embodiment, the state in which a session (PDD session) is established for traffic transmission of a data service between APP_1 that is being executed in a UE and an application server (hereinafter, AS 1) that services APP_1 may be assumed.

In this state, the UE may perform traffic transmission of an APP_1 service using the address information (e.g., an IP) of AS 1 that is the application server corresponding to the end (peer) of the APP_1 service.

Under the assumption, due to a scenario of embodying APP_1 or the like, if an event (e.g., AS1→AS 2) occurs in which a destination IP (application server IP) for traffic of the APP_1 service is changed while the APP_1 service is being provided, an AF of the control plane may provide a notification of the same directly to an SMF or may indirectly provide the notification of the same to the SMF via an NEF after the change of the AS based on the occurrence of the event is successfully completed.

In order to receive such an AS change notification, the network device 100 (AMF/SMF) of the present disclosure may register reception of the notification in the AF according to an operator policy and subscription information of a customer (UE) when a session is established for a data service (APP service).

Accordingly, the change determining unit 110 may receive a server change notification (e.g., AS 1→AS 2) associated with a data service (e.g., APP_1 service) for the UE (e.g., APP_1) from a node of the control plane, that is, the above-described AF.

The above-described server change notification may be received based on monitoring by a node of the user plane, that is, a UPF, or may be received at the point in time at which a change is predicted, that is, before an application server IP is changed, in addition to the scheme of providing a notification by a node (e.g., AF, NEF) of the control plane.

That is, in the present disclosure, the notification scheme in which a server change notification (e.g., AS 1→AS 2) is received may be applicable without restricting the subject of notification in a core and/or public network, the notification point, the notification condition, and the like, and may be transferred to the UE.

The network device 100 (AMF/SMF) of the present disclosure may monitor traffic (data packet) of a data service between an application in the UE and a corresponding application server.

According to an embodiment, while performing data transmission or reception between a UE and an application server via a session with the UE, an UPF may recognize a destination IP in data of a predetermined subscriber (e.g., a subscriber/APP of which the notification reception is registered in an AF by an SMF) and may transfer the same to the SMF (e.g., application detection and control (ADC) operation).

Accordingly, the network device 100 (AMF/SMF) of the present disclosure may monitor, based on the above-described recognition/transferring by the above-described UPF, the address information (e.g., an IP) of a server for traffic transmission at all times for a session for each app in the UE.

Describing the change determining unit 110 again, if a server change notification (e.g., AS 1→AS 2) is received from the AF in association with a session of a data service (e.g., APP_1 service) for a UE (e.g., APP_1), the change determining unit 110 may compare the address information (e.g., IP) of a server (e.g., AS 2) based on the notification and the address information of the server (e.g., AS 1) that the UE (e.g., APP_1) uses for traffic transmission of the data service (e.g., APP_1 service), that is, the address information (e.g., IP) of the monitored current server (e.g., AS 1).

In the case that the address information (e.g., the IP) of the server (e.g., AS 2) based on the notification from the control plane is identical to the address information (e.g., the IP) of the current server (e.g., AS 1) monitored in the user plane, the change determining unit 110 may determine that the server address of the data service (e.g., the APP_1 service) is not changed.

Conversely, in the case that the address information (e.g., the IP) of the server (e.g., AS 2) based on the notification from the control plane is different from the address information (e.g., the IP) of the current server (e.g., AS 1) monitored in the user plane, the change determining unit 110 may determine that the server address of the data service (e.g., the APP_1 service) is changed and may determine that the server address (e.g., the destination IP) for the UE (local cache) needs to be changed.

As described above, based on a predetermined identification, such as an application ID, a slice ID, or the like, the change determining unit 110 may distinguish each application executed by the UE, and may determine whether a server address (destination IP) for the UE (local cache) needs to be changed for a session (irrespective of an active or idle state) for each app in the UE.

In the case that the server address of the data service needs to be changed, the information transferring unit 120 may transfer the address information for the changed server to the UE so that the UE may perform traffic transmission of the data service using the address information of the changed server.

Hereinafter, descriptions will be provided with reference to the case of AS 1→AS 2, that is, the case in which the server of the APP_1 service is changed to AS 2, in the state in which a session is established for traffic transmission of the APP_1 service between the UE (APP_1) and AS 1 that services APP_1.

In this instance, by determining that the server address of the data service (e.g., the APP_1 service) is changed (e.g., AS 1→AS 2), the information transferring unit 120 may immediately transfer the address information (e.g., the IP) of the changed server (e.g., AS 2) to the corresponding UE (APP_1).

In this manner, the corresponding UE (APP_1) may receive the changed server address information (e.g., AS 2 IP) transferred from the network device 100 (AMF/SMF) of the present disclosure, may perform traffic transmission of the APP_1 service using the address information (e.g., the IP) of AS 2 that is an application server corresponding to the end (peer) of the APP_1 service, immediately after receiving the changed server address information (e.g., AS 2 IP), and thus the UE (APP_1) may seamlessly provide the APP_1 service in real time even when an application server is changed.

Hereinafter, the process of transferring the address information of the changed server to the corresponding UE will be described in detail.

In the case in which the report of a change of the server of the data service for the UE is provided from a node of the control plane, for example, the above-described AF, the reconfiguration unit 130 may perform user plane reconfiguration that adds, removes, or rearranges a node of the user plane, that is, a UPF, that is involved in the session.

Descriptions will be provided with reference to the case of AS 1→AS 2, that is, the case in which the server of the APP_1 service is changed to AS 2, in the state in which a session is established for traffic transmission of the APP_1 service between the UE (APP_1) and AS 1 that services APP_1 as described in the embodiment assumed.

In this instance, in the case that the notification of a change of the server (e.g., AS1→AS2) of the data service (e.g., APP_1 service) for the UE (e.g., APP_1) is provided from a node of the control plane, that is, the above-described AF, the reconfiguration unit 130 may be triggered by the notification so as to perform user plane reconfiguration that adds, removes, or rearranges a UPF that is involved in the session (e.g., APP_1) of the corresponding UE.

In this instance, the information transferring unit 120 may immediately transfer the address information (e.g., the IP) of the changed server (e.g., AS 2) to the corresponding UE (APP_1) by utilizing a message transmitted to the corresponding UE in the process of performing the user plane reconfiguration.

For example, the information transferring unit 120 may utilize a message that is transmitted first to the corresponding UE in the process of performing the user plane reconfiguration, for example, may utilize a PDU session modification/update command of NAS PCO.

Furthermore, the information transferring unit 120 may transmit destination information including the address information associated with the changed server (e.g., AS 2) to the corresponding UE (APP_1).

That is, the information transferring unit 120 may transmit, to the corresponding UE (APP_1), destination information that inputs/includes a condition to be applied when the corresponding UE (APP_1) uses the changed server address information (e.g., AS 2 IP), in addition to the address information (e.g., the IP) of the changed server (e.g., AS 2) provided via a notification from the AF.

The destination information may include address information including at least one of the addresses of a link layer (L2), an Internet layer (L3), a transport layer (L4), and an application layer (L7) according to the Internet protocol suite in association with the changed server.

That is, the address information included in the destination information may be distinguished based on destination addresses included in the link layer (L2), the Internet layer (L3), the transport layer (L4), and the application layer (L7) according to the Internet protocol suite, and may be included. For example, L2 may be the destination address of MAC, L3 may be an IP (v4 or v6) address, L4 may be a transport (TCP, UDP, SCTP, DCCP) address, and L7 may be an application (URL/URI/URN of HTTP/S, S/FTP) address.

Furthermore, the destination information may have a configuration including at least one piece of information among activation information associated with the point in time of performing traffic transmission using the address information of the changed server, duration information associated with a performance period, information associated with a protocol apply scheme at the time of performance, and information associated with a protocol processing scheme.

Figure 5:
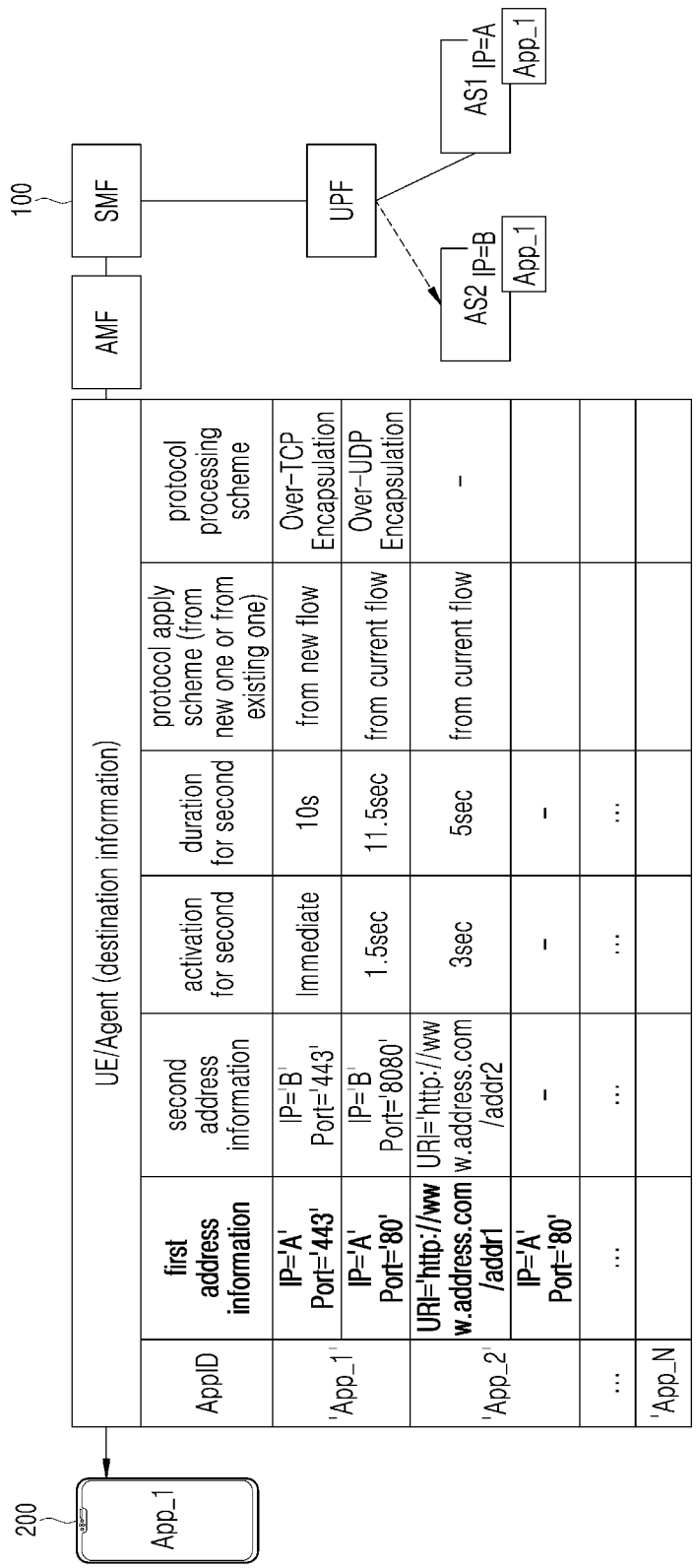
FIG. 5 is a diagram illustrating the configuration of destination information transferred to a UE according to an embodiment of the present disclosure.

FIG. 5 is a diagram illustrating the configuration of destination information transferred to a UE according to an embodiment of the present disclosure.

FIG. 5 assumes the state in which a UE executes APP_1, APP_2 . . . APP_N. In the present disclosure, for a session for each app, first address information is the address information of a current server monitored, and second address information is the address information of a changed server transferred to the UE.

As shown in FIG. 5, the address information of the current/changed server is not limited to an IP that has been mainly mentioned in the above-described embodiment, and may be a port, a URL, or a URI.

As shown in FIG. 5, "activation for a second" information defines when traffic transmission using delivered second address information is to be performed, and "duration for a second" information defines how long traffic transmission using delivered second address information is to be performed.

In addition, "protocol apply scheme" information for a second defines which flow (e.g., a current flow, a new flow) is to be applied first when traffic transmission using delivered second address information is performed. "Protocol processing scheme" information for a second defines a processing scheme (e.g., encapsulation scheme, over-TCP, over-UDP) is to be applied when traffic transmission using delivered second address information is performed.

Here, the activation information, duration information, and protocol apply scheme information may be predicted and determined in a core and/or public network.

For example, in the case of the activation information, an AMF/SMF may determine (including a notification) and set the definition when traffic transmission using delivered second address information is to be performed, in consideration of the time/location/processing time spent in switching a server (e.g., AS1→AS 2) (the period of time spent in reaching the state in which AS1→AS 2 is completely ready and traffic is capable of being received).

FIG. 5 illustrates an example of the configuration of destination information that transfers a change of a server address in association with two sessions of APP_1 and one session of APP_2 among sessions of APP_1, APP_2 . . . APP_N that are being executed in the UE.

Through the above, the corresponding UE may receive the destination information as illustrated in FIG. 5. In this instance, depending on the received destination information, traffic transmission that uses second address information may be performed by applying corresponding activation information, duration information, protocol apply/processing scheme to each of the two sessions of APP_1, and may perform traffic transmission that use second address information by applying activation information, duration information, protocol apply/processing scheme to the one session of APP_2.

Accordingly, the UE (APP_1, APP_2) may seamlessly provide the APP_1 service and the APP_2 service in real time even when an application server is changed.

Hereinafter, the configuration of a UE device that embodies the application server mobility guarantee technique of the present disclosure will be described in detail with reference to FIG. 3.

Figure 3:
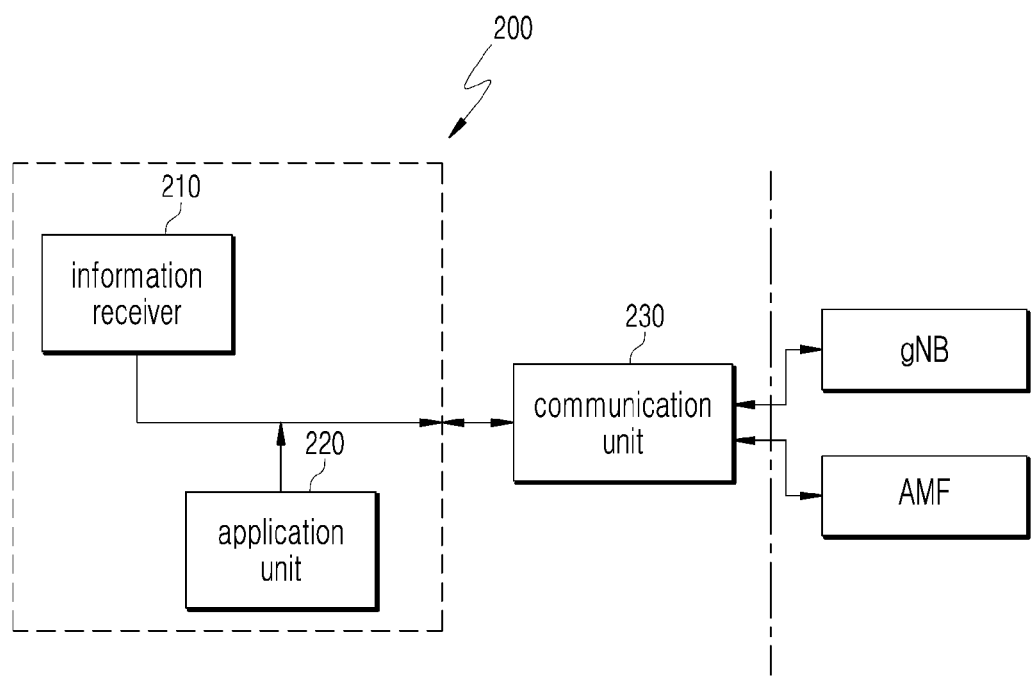
FIG. 3 is a block diagram illustrating the configuration of a UE device according to an embodiment of the present disclosure.

As illustrated in FIG. 3, a UE device 200 according to an embodiment of the present disclosure may include an information receiver 210 and an application unit 220.

The UE device 200 according to an embodiment of the present disclosure may further include a communication unit 230 for communicating with an (R)AN of a wireless section, that is, a gNB, and an AMF.

Accordingly, the communication unit 230 may support an N2 interface that communicates with the (R)AN, that is, the gNB, and an N1 interface defined to communicate with the AMF.

The whole or at least a part of the configuration of the UE device 200 may be embodied in the form of a hardware module or a software module, or may be embodied in the form of a combination of a hardware module and a software module.

Here, the software module may be considered as, for example, an instruction executed by a processor that controls an operation in the UE device 200, and such an instruction may be contained in memory in the UE device 200.

The UE device 200 according to an embodiment of the present disclosure embodies a scheme provided in the present disclosure, that is, the application server mobility guarantee technique, via the above-described configuration.

Hereinafter, each element in the UE device 200 used for embodying the same will be described detail.

In the state in which a session for traffic transmission of a data service between the UE device 200 and a server is established, the information receiver 210 may receive changed server address information that is associated with the server of the data service, and is transferred from a node of the control plane.

Here, the changed server address information may be transferred when the address information of a server that is based on a change of the server of the data service that is provided via a notification from the control plane is different from the address information of a server that is monitored as being used for traffic transmission of the data service in the user plane.

Specifically describing, as described in the detailed description of the network device 100, an AMF/SMF (network device 100) may monitor, at all times, the address information of the current server that is used for traffic transmission of each APP service in the user plane (UPF) with respect to a session for each app in the UE device 200.

In the case that the notification of a change of a server (e.g., AS 1→AS 2) associated with a session of a data service (e.g., the APP_1 service) of the UE device 200 is provided from the control plane (AF), the AMF/SMF (network device 100) may compare the address information (e.g., the IP) of a server (e.g., AS 2) based on the notification from the control plane (AF) and the address information (e.g., the IP) of the current server (e.g., AS 1) monitored in the user plane (UPF).

In the case that the address information (e.g., the IP) of the server (e.g., AS 2) based on the notification is different from the address information (e.g., the IP) of the current server (e.g., AS 1), the AMF/SMF (network device 100) may determine that the server address (e.g., a destination IP) for the UE device 200 needs to be changed and may transfer the changed server address information (e.g., AS 2 IP) to the UE device 200.

Accordingly, in the state in which a session for the APP service of each application (e.g., APP_1, APP_2 . . . APP_N) being executed in the UE device 200 is established, the information receiver 210 may receive changed server address information transferred from a node of the control plane, that is, the AMF/SMF (network device 100).

According to a more detailed embodiment, the information receiver 210 may receive destination information that includes the changed server address information transferred from the AMF/SMF (network device 100) and various conditions input by the SMF.

In the case that the changed server address information, more specifically, the destination information, is received, the application unit 220 may perform traffic transmission of a corresponding data service (e.g., an APP service) using the changed server address information (e.g., AS 2 IP).

For example, in the state in which a session is established for the APP service of each application (e.g., APP_1, APP_2 . . . APP_N) that is being executed in the UE device 200, it may be assumed that a server change event (e.g., AS 1→AS 2) may occur only for an application server (AS 1) that services APP_1.

In this instance, in the example of the configuration of the destination information illustrated in FIG. 5, only the information associated with the session of 'APP_1' (second address information, activation information, duration information, protocol apply/processing scheme) may be changed in the configuration and may be transferred/transmitted to the UE device 200 by the SMF.

In this instance, the application unit 220 (application layer) may receive the destination information from a lower layer that receives the destination information, and immediately after receiving the destination information, may apply, based thereon, each of the activation information, duration information, and protocol applying/processing scheme to the session of APP_1, so as to perform traffic transmission using second address information (changed server address information (e.g., AS 2 IP)) for an application server corresponding to the end (peer) of the APP_1 service.

Accordingly, the UE device 200 (APP_1) may seamlessly provide the APP_1 service in real time even when an application server is changed.

Figure 4:
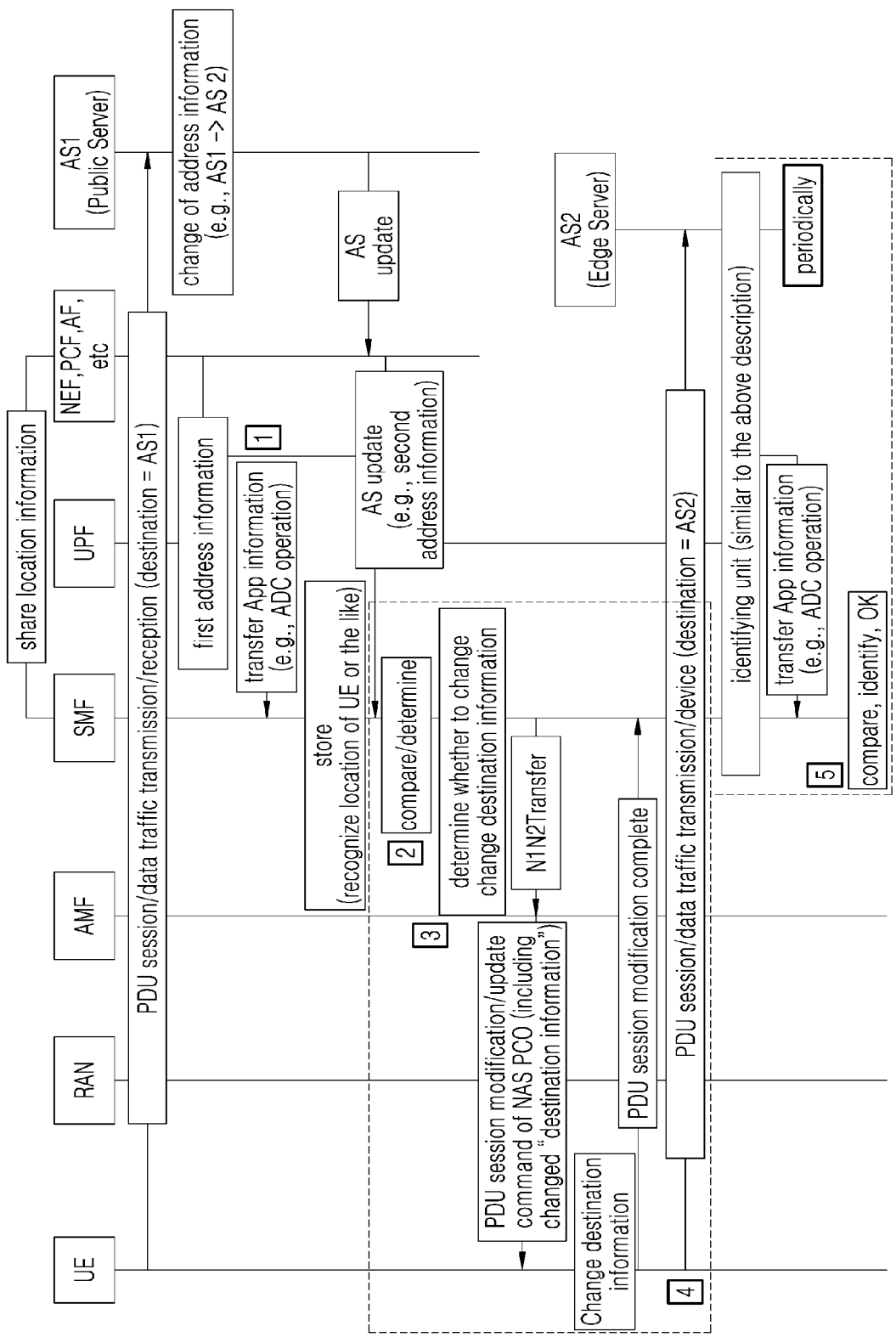
FIG. 4 is a whole flowchart illustrating a scenario of guaranteeing the mobility of an application server according to an embodiment of the present disclosure.

FIG. 4 is a whole flowchart illustrating an example of an application server mobility guarantee scenario of the present disclosure based on the configuration of the above-described network device 100 (AMF/SMF) and the UE device 200.

As illustrated in FIG. 4, while a UE transmits (transmits/receives) traffic of a data service via a session, a UPF may perform data transmission or reception between the UE and an application server (AS 1) via a session with the UE.

In this instance, while performing data transmission or reception between the UE and the application server (AS 1), the UPF may recognize a destination IP in data and may transfer the same to an SMF (e.g., application detection and control (ADC) operation).

Accordingly, in operation (1), based on the recognition/transferring by the UPF, the AMF/SMF (network device 100) may monitor/store, at all times, the address information (e.g., first address information) of a current server used for traffic transmission for a session for each app in the UE.

In the case that, due to an implementation scenario of an APP (e.g., APP_1) being executed in the UE, or the like, an event (e.g., AS 1→AS 2 update) in which the destination IP (application server IP) for the traffic of an APP_1 service is changed occurs while the APP_1 service is provided, an AF may provide a notification directly to the SMF after a change of an AS based on the occurrence of the event is successfully completed, or may indirectly provide the notification to the SMF via an NEF (AS updated/changed server address information (including second address information)).

Accordingly, in operation (2), in the case that a server change notification (e.g., including AS 1→AS 2 update, second address information) associated with the session of the APP_1 service of the UE is received from the AF, the AMF/SMF (network device 100) may compare the first address information and the second address information, and may determine whether the server address (e.g., destination IP) for the UE (APP_1) needs to be changed.

If it is determined that the server address (e.g., destination IP) for the UE (APP_1) needs to be changed since the first address information and the second address information are different from each other, the AMF/SMF (network device 100) may be triggered based on the notification from the above-described AF, so as to perform user plane reconfiguration that adds, removes, or rearranges a UPF that is involved in the session (e.g., APP_1) of the corresponding UE.

In this instance, in operation (3), the AMF/SMF (network device 100) may immediately transmit the address information (e.g., IP) of the changed server (e.g., AS 2), that is, second address information, more specifically, destination information (refer to FIG. 5) configured by including the same to the UE by utilizing a message (e.g., a PDU session modification/update command of NAS PCO) transmitted to the UE while the user plane reconfiguration is performed.

In this instance, the UE may perform traffic transmission using the second address information (changed server address information (e.g., AS 2 IP)) for an application server corresponding to the end (peer) of the APP_1 service by applying, based on the destination information transmitted from a 5G core network (network functions, NFs), each of activation information, duration information, and protocol applying/processing scheme to the session of APP_1.

Accordingly, in operation (4), the UE (APP_1) may seamlessly provide the APP_1 service in real time even when an application server is changed.

In addition, the AMF/SMF (network device 100) may monitor, at all times, the address information of a server used for performing traffic transmission even after transmitting the destination information (refer to FIG. 5) to the UE, and based thereon, may compare the second address information (changed server address information (e.g., AS 2 IP)) based on the destination information (refer to FIG. 5) and server address information monitored after transmitting the destination information (refer to FIG. 5), and may identify whether they are identical, thereby identifying whether the UE normally operates based on the transmission of the destination information (refer to FIG. 5), in operation (5).

As described above, according to an embodiment of the present disclosure, a scheme of monitoring the traffic of an APP service between a UE and a server in a 5G core network function (NFs) at all times, and based thereon, determining, in real time, whether server address information for the UE (local cache) needs to be changed may be realized, and if it is determined that the server address information needs to be changed, a scheme of immediately transferring related information (changed address information or destination information (including changed address information)) to the UE may be realized.

Therefore, according to an embodiment of the present disclosure, a detailed scheme in which a UE is capable of performing the traffic transmission of an APP service immediately using a changed server address every time that the server address (e.g., destination IP) of the APP service that is being used is changed, that is, a detailed scheme that guarantees the mobility of an application server may be realized.

Therefore, according to the present disclosure, by realizing the detailed scheme of guaranteeing the mobility of an application server, an effect of providing a service environment in which an increase in the quality for customers and a low latency service are capable of being realized is obtained.

Figure 6:
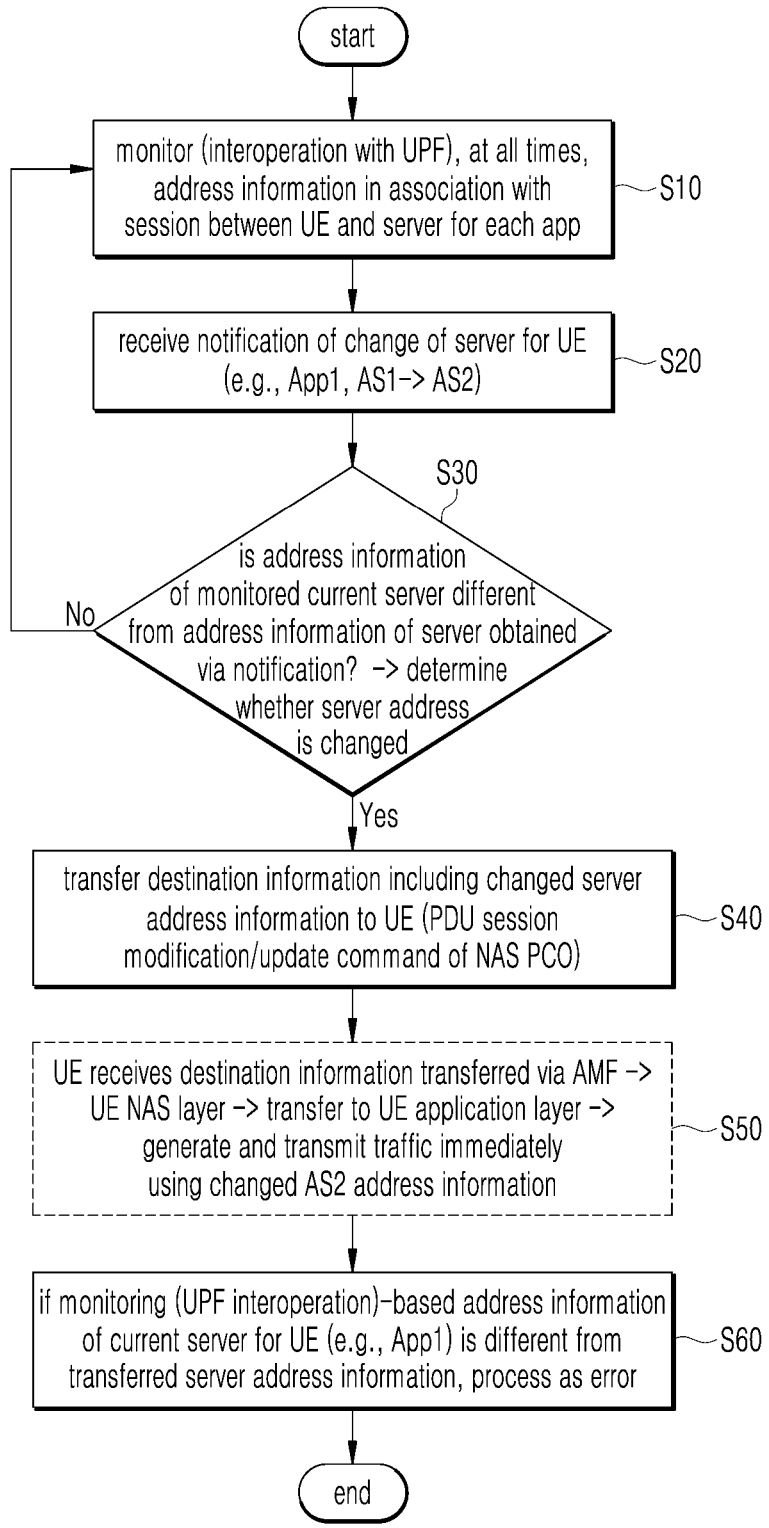
FIG. 6 is a flowchart illustrating an operation method of a base station device (network device) according to an embodiment of the present disclosure.

Hereinafter, referring to FIG. 6, an operation method of a network device according to an embodiment of the present disclosure, in other words, an application server mobility guarantee technique (method) that is realized via the operation method of the network device will be described.

For ease of description, an embodiment will be described by using the reference numerals of the network device 100 and using an AMF and an SMF among the nodes of the control plane as the network device 100.

According to the application server mobility guarantee technique (method) of the present disclosure, the network device 100 (AMF/SMF) may monitor, at all times based on recognition/transferring by an UPF, the address information (e.g., IP) of a server being used for traffic transmission for a session between a UE and an application server for each app, in operation S10.

According to the application server mobility guarantee technique (method) of the present disclosure, the network device 100 (AMF/SMF) may receive a server change notification (e.g., AS 1→AS 2) associated with a data service (e.g., APP_1 service) for the UE (e.g., APP_1) from a node of the control plane, that is, the above-described AF in operation S20.

Accordingly, according to the application server mobility guarantee technique (method) of the present disclosure, in the case of receiving the server change notification (e.g., AS 1→AS 2) in operation S20, the network device 100 (AMF/SMF) may compare the address information (e.g., IP) of a server (e.g., AS 2) based on the notification and the address information (e.g., IP) of the server (e.g., AS 1) that is being used for traffic transmission of the data service (e.g., APP_1 service) for the UE (e.g., AP_1), that is, the address information (e.g., IP) of the monitored current server (e.g., AS 1) in operation S30.

According to the application server mobility guarantee technique (method) of the present disclosure, in the case that the address information (e.g., IP) of the server (AS 2) based on the notification is identical to the address information (e.g., IP) of the current server (e.g., AS 1), the network device 100 (AMF/SMF) may determine that the server address of the data service (e.g., APP_1 service) is not changed (No in operation S30).

Conversely, according to the application server mobility guarantee technique (method) of the present disclosure, in the case that the address information (e.g., IP) of the server (AS 2) based on the notification is different from the address information (e.g., IP) of the current server (e.g., AS 1), the network device 100 (AMF/SMF) may determine that the server address of the data service (e.g., APP_1 service) is changed and the server address (e.g., destination IP) for the UE (local cache) needs to be changed (Yes in operation S30).

As described above, according to the application server mobility guarantee technique (method) of the present disclosure, a scheme of monitoring, at all times, the traffic of the APP service between the UE and the server in the 5G core network (network function (NFs)), and, based thereon, determining in real time whether the server address information for the UE (local cache) needs to be changed is realized.

According to the application server mobility guarantee technique (method) of the present disclosure, in the case that the server address of the data service (e.g., APP_1 service) is determined as being changed (e.g., AS 1→AS 2) (Yes in operation S30) as described above, the network device 100 (AMF/SMF) may immediately transfer the address information (e.g., IP) of the changed server (e.g., AS 2) to the corresponding UE (APP_1) in operation S40.

Specifically, according to the application server mobility guarantee technique (method) of the present disclosure, the network device 100 (AMF/SMF) may transmit destination information including the address information of the changed server (e.g., AS 2) to the corresponding UE (APP_1) in operation S40.

That is, the network device 100 (AMF/SMF) may transmit, to the corresponding UE (APP_1), the destination information that inputs/includes a condition to be applied when the corresponding UE (APP_1) uses the changed server address information (e.g., AS 2 IP), in addition to the address information (e.g., IP) of the changed server (e.g., AS 2) provided via the notification from the AF.

The destination information may include address information including at least one of the addresses of a link layer (L2), an Internet layer (L3), a transport layer (L4), and an application layer (L7) according to the Internet protocol suite in association with the changed server.

That is, the address information included in the destination information may be distinguished based on destination addresses included in the link layer (L2), the Internet layer (L3), the transport layer (L4), and the application layer (L7) according to the Internet protocol suite, and may be included. For example, L2 may be the destination address of MAC, L3 may be an IP (v4 or v6) address, L4 may be a transport (TCP, UDP, SCTP, DCCP) address, and L7 may be an application (URL/URI/URN of HTTP/S, S/FTP) address.

Furthermore, the destination information may have a configuration including at least one piece of information among activation information associated with the point in time of performing traffic transmission using the address information of the changed server, duration information associated with a performance period, information associated with a protocol apply scheme at the time of performance, and information associated with a protocol processing scheme.

FIG. 5 illustrates an example of the configuration of destination information transferred to a UE.

FIG. 5 illustrates an example of the configuration of destination information that transfers a change of a server address in association with two sessions of APP_1 and one session of APP_2 among the sessions of APP_1, APP_2 . . . APP_N that are being executed in a UE.

If it is assumed that an event (e.g., AS 1→AS 2) occurs in which only an application server (AS 1) that services APP_1 is changed among applications (e.g., APP_1, APP_2 . . . APP_N) being executed in the UE as in the above-description, in the example of the configuration of the destination information illustrated in FIG. 5, only information associated with the session of 'APP_1' (second address information, activation information, duration information, protocol apply/processing scheme) is changed in the configuration and may be transferred/transmitted to the UE by the SMF.

In the case that the notification of a change of the server (e.g., AS1→AS2) of the data service (e.g., APP_1 service) for the UE (e.g., APP_1) is provided from the AF in operation S20, the network device 100 (AMF/SMF) may be triggered by the notification, so as to perform user plane reconfiguration that adds, removes, or rearranges a UPF that is involved in the session (e.g., APP_1) of the corresponding UE.

In this instance, the network device 100 (AMF/SMF) may immediately transfer, to the corresponding UE (APP_1), the destination information including the address information (e.g., IP) of the changed server (e.g., AS 2) by utilizing a message (e.g., a PDU session modification/update command of NAS PCO) transmitted to the corresponding UE in the process of performing the above-described user plane reconfiguration in operation S40.

In this instance, in the UE, a lower layer (e.g., UE NAS layer) that receives the destination information transfers the same to a higher UE application layer, and immediately after receiving the destination information, the UE application layer may perform, based thereon, traffic transmission using second address information (changed server address information (e.g., AS 2 IP)) for an application server corresponding to the end (peer) of the APP_1 service by applying each activation information, duration information, and protocol applying/processing scheme to the session of APP_1.

Accordingly, the UE (APP_1) may seamlessly provide the APP_1 service in real time even when an application server is changed in operation S50.

Furthermore, the application server mobility guarantee technique (method) of the present disclosure, the network device 100 (AMF/SMF) monitors, at all times, the address information of a server being used for traffic transmission even after transmitting the destination information to the UE, and based thereon, the network device 100 (AMF/SMF) may compare the second address information (changed server address information (e.g., AS 2 IP)) based on the destination information and the server address information monitored after transmitting the destination information, and may identify whether they are identical, thereby identifying whether the UE normally operates by transmission of the destination information in operation S60.

As described above, according to an embodiment of the present disclosure, a scheme of monitoring, at all times, the traffic of an APP service between a UE and a server in a 5G core network function (NFs), and based thereon, determining, in real time, whether server address information for the UE (local cache) needs to be changed may be realized, and if it is determined that the server address information needs to be changed, a scheme of immediately transferring related information (changed address information or destination information (including changed address information)) to the UE may be realized.

Therefore, according to the application server mobility guarantee technique (method) of the present disclosure, a scheme in which a UE performs the traffic transmission of an APP service immediately using a changed server address every time that the server address (e.g., destination IP) of the APP service that is being used is changed, that is, a detailed scheme that guarantees the mobility of an application server may be realized.

Therefore, according to the application server mobility guarantee technique (method) of the present disclosure, by realizing the detailed scheme of guaranteeing the mobility of an application server, an effect of providing a service environment in which an increase in the quality for customers and a low latency service are capable of being realized is obtained.

As described above, the application server mobility guarantee technique (method) according to an embodiment of the present disclosure may be embodied in the form of a program command implemented by various computer devices, and may be recorded in a computer-readable medium. The computer-readable medium may include a program command, a data file, a data structure, and the like independently or in combination. The program command recorded in the medium may be designed or configured especially for the present disclosure or may be publicly known to those skilled in the computer software field and may be allowed to be used. Examples of the computer-readable recording medium may include magnetic media such as hard disk, floppy disk, and magnetic tape, optical media such as CD-ROM and DVD, magneto-optical media such as floptical disk, and a hardware device specially configured to store and implement program commands such as ROM, RAM, flash memory, and the like. In addition, the program commands may include, for example, high class language codes, which can be executed in a computer by using an interpreter, as well as machine codes made by a compiler. The above-mentioned hardware device may be configured to operate as one or more software modules in order to perform operations in the present disclosure, and vice versa.

Although the present disclosure has been described in detail with reference to various embodiments, the present disclosure is not limited to the above-described embodiments, and the technical idea of the present disclosure may have the scope within which those skilled in the art field of the present disclosure are capable of making various modifications or collections without departing from the subject matter of the present disclosure claimed in the following claims.

The invention claimed is:

1. A base station device to provide data services between a user equipment (UE) and a data network, the base station device comprising:
a memory to store instructions;
a processor configured to receive the instructions from the memory and to perform operations to:
determine a server address of an application server for a session for traffic transmission of a specific data service between a specific application in the UE and the application server;
determine, in real time, that a server address of the specific data service for the UE is changed in a state in which the session for traffic transmission of the specific data service between the specific application in the UE and the application server is established; and
in response to the determination that the server address of the specific data service is changed, transfer address information of the changed application server to the UE in real time such that the UE is to perform traffic transmission of the specific data service between the specific application in the UE and the changed application server using the transferred address information of the changed application server, and
wherein, when a notification of a change of the application server of the specific data service for the UE is provided from a node of a control plane, the processor is configured to transfer the address information of the changed application server via a message transmitted to the UE during a process of performing user plane reconfiguration that adds, removes, or rearranges a node of a user plane that is involved in the session.

2. The base station device of claim 1, wherein, when a notification of a change of the application server of the specific data service for the UE is provided from a node of a control plane, the processor is configured to compare address information of the application server based on the notification and address information of the application server that the UE uses when performing the traffic transmission of the specific data service, and to determine whether the server address of the specific data service for the UE is changed based on the comparison.

3. The base station device of claim 2, wherein the address information of the application server that the UE uses when performing the traffic transmission of the specific data service is monitored based on the node of the user plane that is involved in the session.

4. The base station device of claim 1, wherein the processor is configured to transmit destination information including the address information to the UE, and
wherein the destination information comprises at least one information of address information including at least one of addresses of link layer (L12), internet layer (L3), transport layer (L4), and application layer (L7) according to internet protocol suite in association with the changed application server, activation information associated with a time point of performing traffic transmission using the address information of the changed application server, duration information associated with a performance period, information associated with a protocol apply scheme, and information associated with a protocol processing scheme.

5. The base station device of claim 1, wherein the base station device is at least one of nodes of the control plane.

6. An operation method of a base station device, the method comprising:
determining a server address of an application server for a session for traffic transmission of a specific data service between a specific application in the UE and an application server;
determining, in real time, that a server address of the specific data service for the UE is changed in a state in which the session for traffic transmission of the specific data service between the specific application in the UE and the application server is established; and
in response to the determination that the server address of the specific data service is changed, transferring address information of a changed application server to the UE in real time such that the UE is to perform the traffic transmission of the specific data service between the specific application in the UE and the changed application server using the transferred address information of the changed application server,
wherein the determining in real time that the server address of the specific data service for the UE is changed comprises:
when a notification of a change of the application server of the specific data service for the UE is provided from a node of a control plane, transferring the address information of the changed application server via a message transmitted to the UE during a process of performing user plane reconfiguration that adds, removes, or rearranges a node of a user plane that is involved in the session.

7. The method of claim 6, wherein the determining in real time that the server address of the specific data service for the UE is changed comprises:
comparing, when a notification of a change of the application server of the specific data service for the UE is provided from a node of a control plane, the address information of the application server based on the notification and address information of the application server that the UE uses when performing the traffic transmission of the specific data service; and
determining, based on a result of the comparison, whether the server address of the data service is changed.

8. The method of claim 7, wherein the address information of the application server that the UE uses for traffic transmission of the specific data service is monitored based on the node of the user plane that is involved in the session.

* * * * *